A. WEIDMANN.
Bird-Toy.
No. 219,045. Patented Aug. 26, 1879.
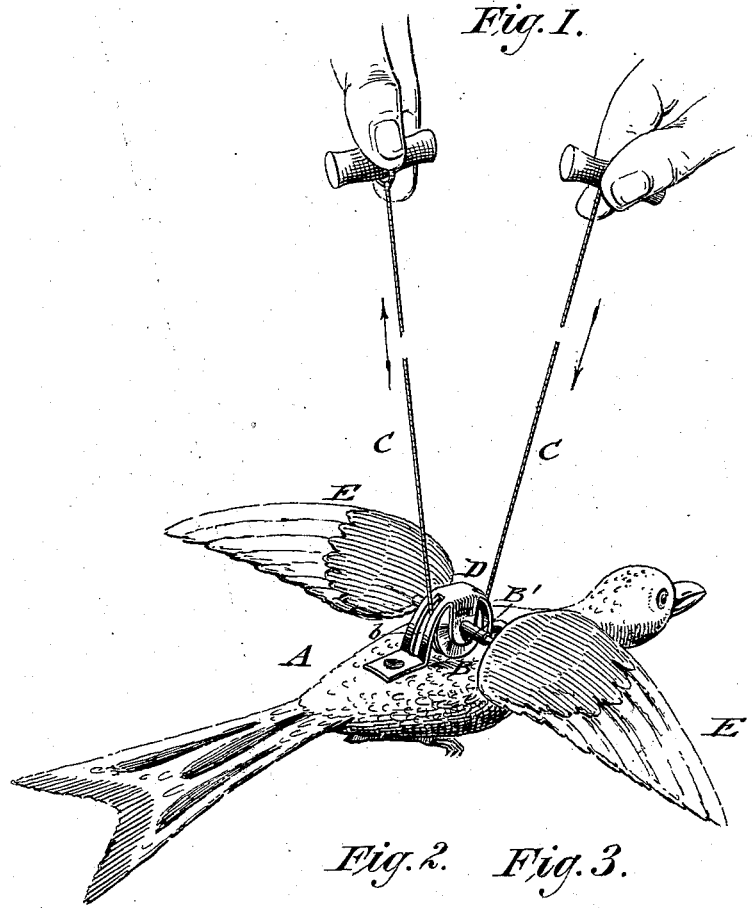
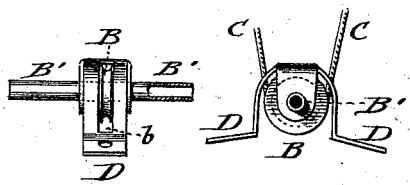
WITNESSES:
INVENTOR:
ATTORNEYS.

UNITED STATES PATENT OFFICE

ANTON WEIDMANN, OF NEW YORK, N. Y.

IMPROVEMENT IN BIRD TOYS.

Specification forming part of Letters Patent No. 219,045, dated August 26, 1879; application filed July 3, 1879.

*To all whom it may concern:*

Be it known that I, ANTON WEIDMANN, of the city, county, and State of New York, have invented certain new and useful Improvements in Toys, of which the following is a specification.

In the accompanying drawings, Figure 1 represents a perspective view of my improved toy; and Figs. 2 and 3 are, respectively, an end view and a side view of the pulley-support, shown detached from the toy.

Similar letters of reference indicate corresponding parts.

This invention relates to an improved toy, by which a flying bird is imitated; and the invention consists of the body of a bird that is propelled forward and back by a cord and pulley, the pulley imparting simultaneously therewith rotary motion to the wings of the bird, which are connected to the shaft of the pulley.

A slotted support with journaled bearings is attached to the body of the bird and forms the support for the pulley-shaft.

Referring to the drawings, A represents the body of a bird or other device, which is hung, by means of a pulley, B, to a cord, C. By means of handles at the ends of the cord the same is alternately raised and lowered, and imparts thereby a forward or backward motion to the body A.

One end of the cord may also be attached to a fixed point of support, and the cord stretched taut by pulling at the opposite end, a forward- and-return motion being then imparted to the body A by gravity on alternately raising or lowering the free end above or below the fixed end.

The pulley B is keyed to its shaft B', which revolves in downwardly-extending bearings $a$ of a support, D, attached to the back of the body A.

The wings E are either permanently attached to the shaft B' or (preferably) inserted into the hollow ends of the shaft, so as to admit the detaching of the wings and the more convenient packing of the same with the body.

The support D is stamped out of sheet metal, with longitudinal slots $b$ for the passage of the cord C, and with the bearings $a$ intermediately between the slotted ends. The support D is bent into semicircular shape and attached at the ends to the body A.

The wings are preferably painted in chromatic color, so as to attract the eyes.

By propelling the bird forward and backward on the cord the wings attached to the pulley are revolved at the same time, and thus the entertaining impression of a flying bird produced.

Having thus described my invention, I claim as new and desire to secure by Letters Patent—

1. The combination of the body of a bird or other figure having a pulley and wings attached to the shaft of a pulley with a propelling-cord, by which the body is moved forward or backward simultaneously with the revolving of the wings, substantially as and for the purpose set forth.

2. The combination of body A, having a slotted and journaled support, D, with a revolving pulley, B, propelling-cord C, and wings E, secured to the shaft of the pulley, substantially as specified.

In testimony that I claim the foregoing as my invention I have signed my name in presence of two witnesses this 1st day of July, 1879.

A. WEIDMANN.

Witnesses:
PAUL GOEPEL,
CARL KARP.